United States Patent [19]

Yokota et al.

[11] Patent Number: 4,666,823

[45] Date of Patent: May 19, 1987

[54] METHOD FOR PRODUCING INK JET RECORDING HEAD

[75] Inventors: Masami Yokota, Hiratsuka; Hiroshi Sugitani, Machida; Tadayoshi Inamoto, Hiratsuka, all of Japan

[73] Assignee: Canon Kabushiki Kaisha, Tokyo, Japan

[21] Appl. No.: 762,034

[22] Filed: Aug. 2, 1985

Related U.S. Application Data

[63] Continuation of Ser. No. 501,566, Jun. 6, 1983, abandoned.

[30] Foreign Application Priority Data

Jun. 18, 1982 [JP] Japan ............................... 57-103725

[51] Int. Cl.[4] ........................ G03C 5/00; G01D 15/16

[52] U.S. Cl. .................................... 430/320; 430/324; 430/325; 430/328; 430/330; 346/140 R

[58] Field of Search ............... 430/320, 322, 324, 330, 430/328, 394, 331; 346/1.1, 75, 140 R, 140 PD

[56] References Cited

U.S. PATENT DOCUMENTS

| | | | |
|---|---|---|---|
| 4,167,669 | 9/1979 | Panico | 250/341 |
| 4,394,670 | 7/1983 | Sugitani et al. | 346/140 R |
| 4,417,251 | 11/1983 | Sugitani | 346/1.1 |
| 4,437,100 | 3/1984 | Sugitani et al. | 346/1.1 |
| 4,443,533 | 4/1984 | Panico | 430/311 |
| 4,509,063 | 4/1985 | Sugitani et al. | 346/140 R |
| 4,521,787 | 6/1985 | Yokota et al. | 346/140 R |
| 4,570,167 | 2/1986 | Sugitani et al. | 346/140 R |
| 4,609,427 | 9/1986 | Inamoto et al. | 156/633 |

OTHER PUBLICATIONS

Barry et al., IBM Technical Disclosure Bulletin, vol. 24, No. 10, Mar. 1982, p. 5160.

*Primary Examiner*—John E. Kittle
*Assistant Examiner*—José G. Dees
*Attorney, Agent, or Firm*—Fitzpatrick, Cella, Harper & Scinto

[57] ABSTRACT

A method for producing an ink jet head comprises providing ink pathways formed of a photosensitive resin on the surface of a substrate and laminating covering over said pathways, and said photosensitive resin is exposed to light and the unexposed portion thereof is removed, the covering is placed over said photosensitive resin, and thereafter said photosensitive resin is subjected to the curing treatment.

15 Claims, 7 Drawing Figures

METHOD FOR PRODUCING INK JET RECORDING HEAD

This application is a continuation of application Ser. No. 501,566, filed June 6, 1983, now abandoned.

BACKGROUND OF THE INVENTION

1. Field of the Invention

This invention relates to an ink jet recording head, and more particularly to a method for producing an ink jet recording head for the generation of small droplets of ink to be used for ink jet recording system.

Ink jet recording heads for ink jet recording systems are generally provided with minute ink discharging outlets (orifices), ink pathways and an ink discharging pressure generation portion provided on a part of the ink pathway.

2. Description of the Prior Art

In the prior art, as the method for preparing ink jet recording heads, there is known, for example, the method in which minute grooves are formed on a plate of glass or metal by cutting or etching and then the plate having formed grooves is bonded with an appropriate plate to form ink pathways.

However, in the head prepared by such a method of the prior art, there may occur excessive coarsening of the internal walls of the ink pathways worked by cutting or distortions due to the difference in etching degree, whereby ink pathways with good precision can hardly be obtained and the ink jet recording heads after preparation are liable to give ink discharging characteristics which are scattered. Also, during cutting working, chipping or cracking of the plate is liable to occur to give a disadvantageously poor yield of production. And, when etching working is applied, it involves a large number of production steps to bring about a disadvantageous increase of cost. Further, as the drawback common in the preparation methods of the prior art as mentioned above, during lamination of an engraved plate having formed ink pathway grooves and a lid plate having formed driving elements such as piezoelectric elements, heat generating elements for generating energies acting on ink, it is difficult to effect registration therebetween with good precision, thus failing to afford bulk production.

As a new method for producing ink jet recording heads which can overcome these drawbacks, there is proposed the method for production of ink jet heads in which ink pathway walls comprising a cured film of a photosensitive resin are formed on a substrate provided with ink discharging pressure generating elements and thereafter covering are provided over said ink pathways, as disclosed in Japanese Patent Laid-open Publication No. 43876/1982.

The ink jet recording head manufactured with the cured film of a photosensitive resin is excellent in that it overcomes the drawbacks in the ink jet recording head of the prior art, namely poor precision of the finished ink pathways, complicated production steps and low production yield. However, due to the bonding strength, which is not so great, between the substrate having ink discharging pressure generating elements provided thereon and the ink pathway walls comprising a cured film of a photosensitive resin, when a photosensitive resin film is employed as the covering over said ink pathway walls, the covering made of the photosensitive resin is shrunk by curing, whereby the ink pathway walls are drawn toward the direction of shrinkage of the covering until they are peeled off from the substrate. Even when the bonding strength between the ink pathway walls and the substrate may be sufficient, there is the drawback that the ink pathway walls are drawn toward the shrinking direction of the covering to give no ink pathway of the desired shape.

Further, when an adhesive of a type curable at normal temperature, a thermosetting type or a photocurable type may be employed for provision of the ink pathway walls, not only does the shrinkage of the adhesive occur similarly as described above, but also the adhesive may flow into the ink pathways to clog the ink pathways, whereby the production yield is markedly lowered.

SUMMARY OF THE INVENTION

The present invention has been accomplished in view of the above drawbacks and, an object of the present invention is to provide a novel method for preparing an ink recording head which is precise and also high in reliability. It is also another object of the present invention to provide a method for producing ink jet head having a constitution with ink pathways minutely worked faithfully to the design with good precision. Further, it is still another object of the present invention to provide a method for producing an ink jet head which is excellent in use durability as well as in dimensional stability and also free from peel-off between the substrate and pathway walls.

According to the present invention, there is provided a method for producing an ink jet head which comprises providing ink pathways formed of a photosensitive resin on the surface of a substrate and laminating a covering over said pathways, characterized in that said photosensitive resin is exposed to light and the unexposed portion is removed, the covering is placed over said photosensitive resin and thereafter said photosensitive resin is subjected to the curing treatment.

DESCRIPTION OF THE PREFERRED EMBODIMENTS

Figure 1:
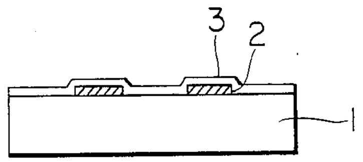
FIGS. 1 through 7 are schematic illustrations for explanation of the preparation procedure of the ink jet recording head of the present invention.

Referring now to the drawings, the embodiments of this invention are to be described.

In the step shown in FIG. 1, ink discharging pressure generating elements 2 such as heat generating elements or piezo elements are arranged in a desired number on a substrate 1 of glass, ceramic, plastic, metal or the like, and further, if desired, for the purpose of imparting ink resistance, electrical insulation, etc., there may be coated on top of the elements 2 a thin film 3 such as of $SiO_2$, $Ta_2O_5$, glass, etc. To the ink discharging pressure generating elements 2 are connected electrodes for the input of signals, although not shown in the drawing.

Figure 2:
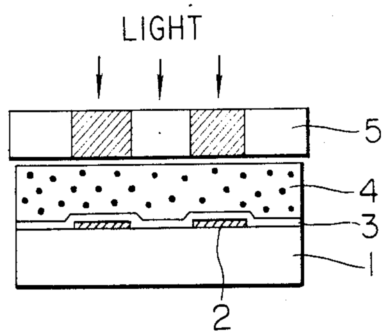

In the subsequent step shown in FIG. 2, the surface of the thin film 3 on the substrate 1 obtained following the step as shown in FIG. 1 is cleaned and dried, followed by lamination of a dry film photoresist 4 (film thickness: about 25 $\mu m$ to 100 $\mu m$) heated to about 80° to 105° C. superposed on the thin film layer 3 at a speed of 0.5 to 4 f/min. under the pressurizing condition of 1 to 3 $Kg/cm^2$. By such an operation, the dry film photoresist 4 is fused to the thin film layer 3. As the next step, after a photomask 5 having a desired pattern is superposed on the dry film photoresist 4 provided on the substrate surface, light exposure is applied from over the photomask 5 as shown in FIG. 2. In this step, it is necessary to have the position at which the ink discharging pressure generating element 2 is to be arranged adapted in correspondence to the position of the pattern in a conventional manner.

Figure 3:
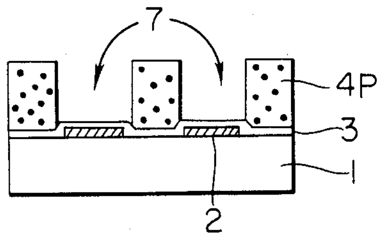

FIG. 3 is a drawing illustrating the step in which the unexposed portion of the above exposed dry film photoresist 4 is removed by dissolution with a developer comprising a certain organic solvent such as trichloroethane, etc. And, the dry film photoresist remaining on the substrate after the above development has a residual adhesiveness, because no sufficient polymerization has been effected.

Figure 4:
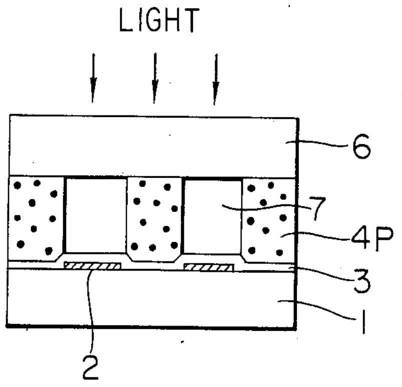

FIG. 4 shows a drawing, in which heat curing treatment (e.g., by heating at 130° C. to 250° C. for 30 minutes to 6 hours) is applied on the dry film photoresist 4P while applying a pressure on a flat plate 6 comprising a material transmissive to UV-ray (e.g., glass) as the covering over the ink pathways on the substrate 1 having grooves 7 for ink pathways formed by the dry film photoresist 4P having residual adhesiveness, followed further by UV-ray irradiation (e.g., at an integrated dosage of 1 $w/cm^2$ to 20 $w/cm^2$) to permit the polymerizing curing reaction of the dry film photoresist to proceed to completion (the post curing treatment), thus fixing the flat plate 6 for the covering over said ink pathways.

As the material for the flat plate 6 to serve as the covering over the ink pathways, a glass which is transparent and has a high transmittance of UV-rays, an epoxy resin, an acrylic resin, etc., is preferred because of applicability of the post curing treatment by way of photopolymerization. However, in the case when the ink itself has a composition having little influence on the photosensitive resin (e.g., an ink principally composed of water) or in the case when the photosensitive resin is post-cured through thermal polymerization, it is possible to practice the post curing treatment by way of heat curing treatment using metals, ceramics and others as the material for the covering. Accordingly, the material of the covering also is not limited in the method of this invention, but various materials can be employed by taking convenience in manufacturing, economy or dimensional stability into consideration.

Also, in providing a flat plate 6 for the covering over the ink pathways in pressure contact with the semi-cured dry film photoresist, it is an effective method to roughen the surface of the flat plate 6 previously for the purpose of enhancing the adhesive force between the flat plate and the dry film photoresist. Further, when an inorganic material (e.g., glass, quartz, etc.) is employed for the flat plate for the covering over the ink pathways, the surface of the flat plate 6 can effectively be treated with a silane coupling agent.

Figure 5:
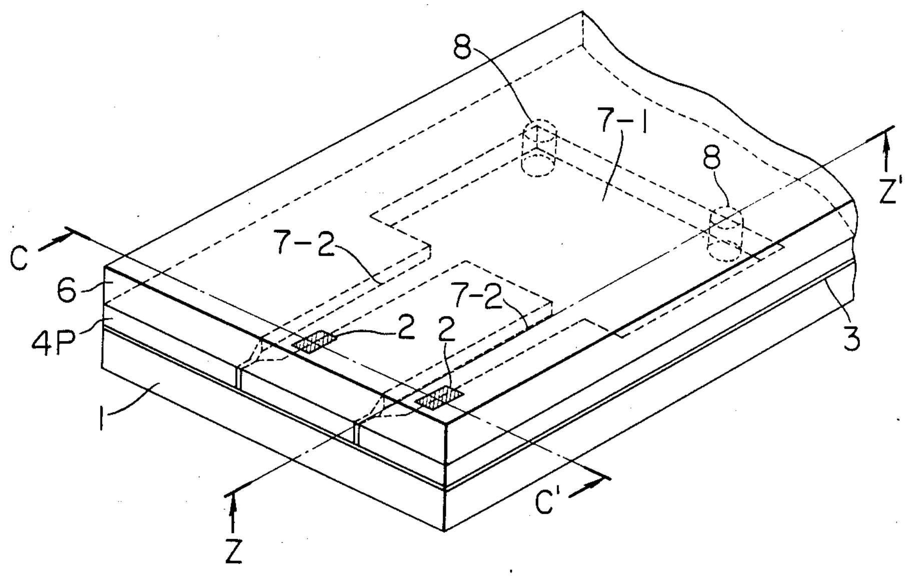
Figure 7:
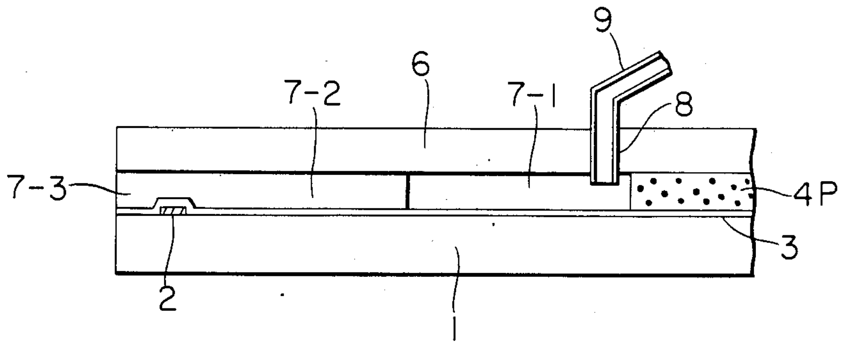

FIG. 5 shows a schematic perspective view of the head appearance after completion of the step shown in FIG. 4. In FIG. 5, 7-1 is an ink supplying chamber, 7-2 narrow ink-flow pathways and 8 through-holes for connection of ink supplying tubes not shown in the drawing to the ink supplying chamber 7-1.

As described above, after completion of the bonding between the substrate having formed grooves and the flat plate, the bonded segment is cut along the line C-C′ shown in FIG. 5. This is done for optimization of the interval between the ink discharging pressure generating element 2 and the ink discharging outlet 7-3 in the narrow ink-flow pathways 7-2, and the region to be cut may be determined suitably as desired. For this cutting, there may be employed the dicing method conventionally used in the semiconductor industries.

Figure 6:
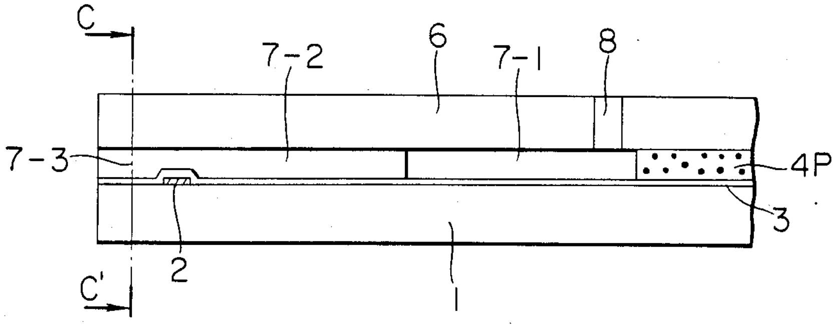

FIG. 6 is a sectional view taken along the line 2—2′ in FIG. 5. And, the cut face is polished to be smoothened and the ink supplying tubes are mounted onto the through-holes 8 to complete the ink jet recording head (FIG. 7).

In the embodiments as shown in the drawings as described above, as the photosensitive composition (photoresist) for preparation of the grooves, there has been employed the dry film type, namely a solid, to which, however, the present invention is not limited, but a liquid photosensitive composition may also be available.

And, as the method for forming the coated film of this photosensitive composition, there may be employed, in the case of a liquid, the squeegee method used in preparation of a relief image, namely the method in which a wall having a height corresponding to the desired film thickness of the photosensitive composition is placed around the substrate and the superfluous composition is removed by means of a squeegee. In this case, the photosensitive composition may have a viscosity suitably of 100 cps to 300 cps. The height of the wall to be placed around the substrate is required to be determined by taking the amount to be reduced through evaporation of the solvent component of the photosensitive composition into consideration.

On the other hand, in case of a solid, the photosensitive composition sheet is laminated onto the substrate by pressure contact under heating. In the present invention, it is advantageous to utilize a solid film type from the standpoint of handling as well as easy and precise control of the thickness. As such solid materials, there are photosensitive resins commercially available under the trade names of Permanent Photopolymer Coating RISTON, Solder Mask 730S, 740S, 730FR, 740FR and SM1, produced by Du Pont Co., and Photec SR-1000, SR-2000 and SR-3000, produced by Hitachi Kasei Co. In addition, as the photosensitive composition to be used in the present invention, there may also be employed a number of photosensitive compositions employed in the field of photolithography in general such as photosensitive resins, photoresists, etc. These photosensitive compositions may include, for example, diazo resins; p-diazoquinones and further photopolymerizable type photopolymers such as those employing vinyl monomers and polymerization initiators; dimerization type photopolymers employing polyvinyl cinnamate, etc. and sensitizers; mixtures of o-naphthoquinone azide and novolac type phenol resins; mixtures of polyvinyl alcohol and diazo resins; polyether type photopolymers having copolymerized 4-glycidylethyleneoxide with benzophenone or glycidylcalcone; copolymers of N,N-dimethyl-methacrylamide with, for example, benzophenone; unsaturated polyester type photosensitive resins [e.g. APR (Asahi Kasei), Tevista (Teijin), Sonne (Kansai Paint), etc.]; unsaturated urethane oligomer type photosensitive resins; photosensitive compositions comprising mixtures of bi-functional acryl monomers with photopolymerization initiators and polymers; bichromic acid type photoresist; non-chromium type water soluble photoresist; polycyannamic acid vinyl type photoresist; cyclized rubber-azide type photoresist, etc.

As described in detail above, the present invention has the effects enumerated below.

1. The principal step for preparation of the head depends on the so-called photolithographic technique, whereby formation of the minute head portion with a desired pattern can be performed very easily. Moreover, a number of heads with the same constitution and the same performance can be worked at the same time.

2. Since no adhesive is used between the substrate and the ink pathway walls and between the ink pathway walls and its covering, there is caused no such inconvenience as degradation function through clogging of the ink pathways by flowing of the adhesive or attachment of ink on the discharging pressure generating element.

3. Due to the absence of curing shrinkage of the covering over the ink pathways, there remains no internal stress within the head, whereby no peel-off, deformation or displacement of the constituting members occurs to give an ink jet head having very good durability.

4. When the flat plate for the covering over the flow pathways has light transmittance, the state of the movement of the ink droplets within the ink jet head can be visually observed to afford easy maintenance of the head obtained.

What we claim is:

1. A method for producing an ink jet head, which comprises providing ink pathways formed from a photosensitive resin on the surface of a substrate and laminating a covering over said pathways, characterized in that said photosensitive resin is imagewise exposed to light and said unexposed portion thereof is removed, the covering is placed over said photosensitive resin, and thereafter said photosensitive resin is subjected to a curing treatment.

2. A method according to claim 1, wherein said photosensitive resin is a dry film photoresist.

3. A method according to claim 1, wherein said photosensitive resin after removing said exposed portion thereof is subjected to said curing treatment by photopolymerization through a board of UV transparent material as said covering.

4. A method according to claim 1, wherein said photosensitive resin, after removal of said unexposed portion thereof, is subjected to said curing treatment by thermo-curing and wherein said covering comprises a board comprising a material selected from metals, ceramics and the like.

5. A method according to claim 1, wherein said photosensitive resin film on said substrate is formed with a liquid resin by a squeegeeing process.

6. A method according to claim 1, wherein said curing is thermal curing.

7. A method according to claim 6, said thermal curing takes place at a temperature of 130° C. to 250° C. for 30 minutes to 6 hours.

8. A method according to claim 1, wherein said curing is a combination of ultraviolet irradiation and thermal curing.

9. A method according to claim 8, wherein said ultraviolet irradiation takes place at an integrated dosage of 1 w/cm$^2$ to 20 w/cm$^2$ and said thermal curing takes place at a temperature of 130° C. to 250° C. for 30 minutes to 6 hours.

10. A method according to claim 1, wherein said covering has a roughened surface.

11. A method according to claim 1, wherein said covering is laminated over said pathways after having been treated with a silane coupling agent.

12. A method according to claim 1, wherein said curing takes place with ultraviolet irradiation.

13. A method according to claim 12, wherein said ultraviolet irradiation takes place at an integrated dosage of 1 w/cm$^2$ to 20 w/cm$^2$.

14. A method according to claim 1, which further comprises treating at least part of said covering that contact a surface of the photosensitive resin to provide a roughened surface on said covering.

15. A method according to claim 1, which further comprises treating at least part of said covering that contacts a surface of the photosensitive resin with a silane coupling agent.

* * * * *